March 30, 1954
O. C. MONTGOMERY
2,673,899
AUTOMATIC VOLUME CONTROL SYSTEM
Filed Sept. 23, 1949
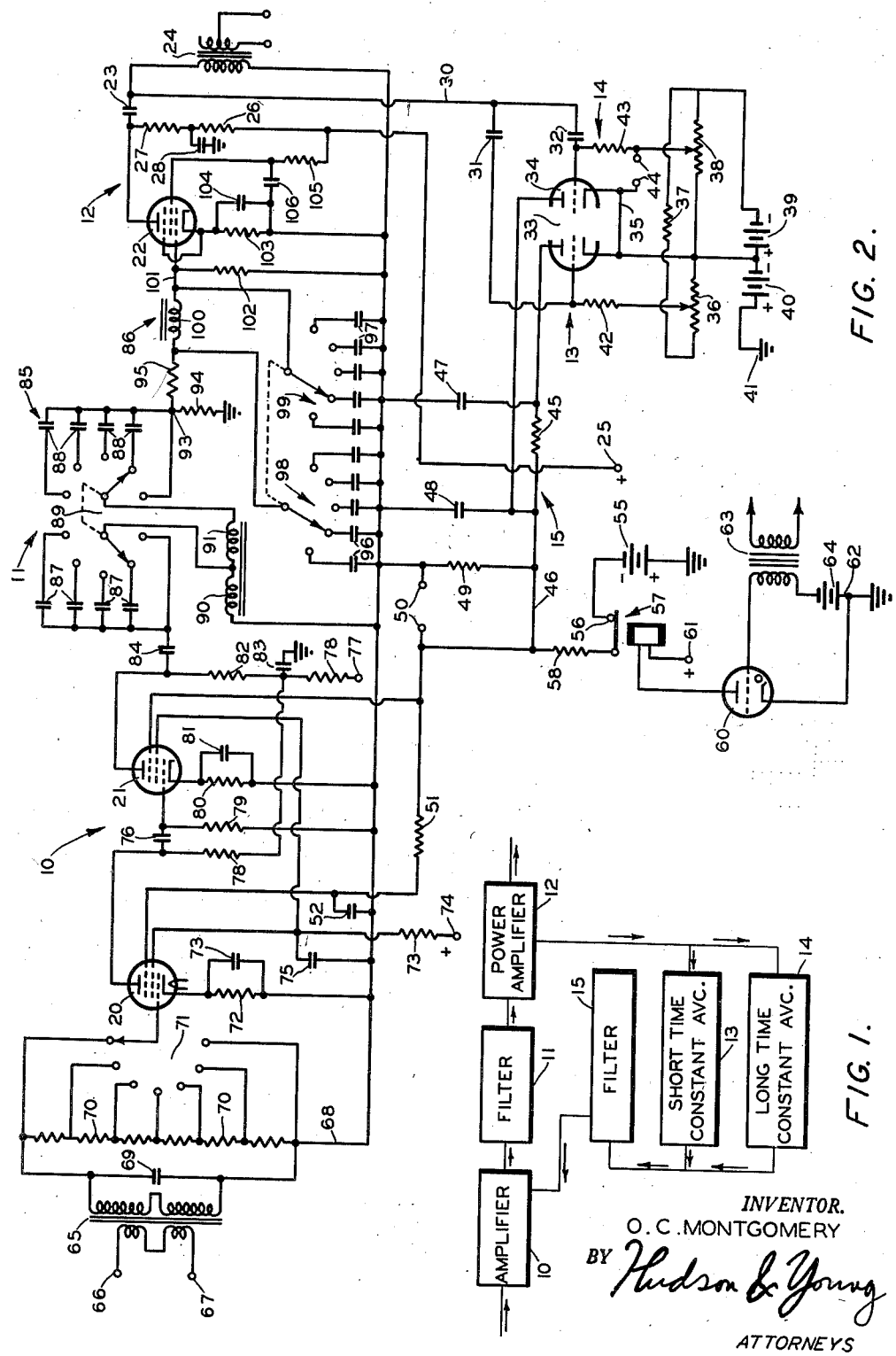
INVENTOR.
O. C. MONTGOMERY
BY Hudson & Young
ATTORNEYS Patented Mar. 30, 1954

2,673,899

UNITED STATES PATENT OFFICE 2,673,899

AUTOMATIC VOLUME CONTROL SYSTEM

Orin C. Montgomery, Bartlesville, Okla., assignor to Phillips Petroleum Company, a corporation of Delaware Application September 23, 1949, Serial No. 117,478

14 Claims. (Cl. 179—171)

This invention relates to an improved automatic volume control system for seismic amplifiers. In another aspect, it relates to a filter circuit for use with such amplifiers.

In seismic surveying, an explosive charge is fired at a predetermined location in the earth, known as the "shot point," and waves are propagated through the earth by this explosion. A portion of these waves travel downwardly through the earth, are reflected from subterranean strata, and the reflected waves are picked up by mechano-electrical transducers, such as geophones, which produce an electrical voltage representative of the reflected waves. By measuring the time interval between the firing of the charge, referred to as the shot instant, and the time at which the reflected waves are picked up by the geophones, valuable information can be obtained as to the nature and location of the subterranean strata. In ordinary practice, the electrical output of the transducer or geophone is amplified and the amplified voltages are used to actuate a recorder unit.

Many difficulties have been encountered in maintaining the proper amplifier gain during the recording period. The first signal produced by the geophone as a result of the explosion is oftentimes quite weak, but the signal level then quickly builds up to an amplitude of as much as 10,000 times the original amplitude, and then rapidly decreases again.

In order to make recordings from a number of different points on a narrow width of photographic paper, it is necessary that the amplifier gain be regulated so that the recorder input does not vary beyond preselected limits, despite the aforementioned very large changes in signal strength. Otherwise, the recorder trace will move off the record when the signal amplitude is high.

One method heretofore used is an expander action volume control, in wthich the amplifier gain is started out at a very low level and is permitted to increase at a predetermined rate, starting at the shot instant. This does not provide the proper amplifier gain-signal strength relation unless several trial recordings are made to properly adjust the equipment. In addition, the expander action volume control does not provide for maximum gain of the weak first signals which, accordingly, are not properly recorded.

Another method previously used involves an automatic volume control which adjusts the gain of the amplifier so that the outlet amplitude remains about the same with large changes in input signals. This permits the amplifier gain to be at a maximum at the beginning of the record and to be adjusted automatically with respect to the input signal throughout the record. It is necessary to cause the gain to change at a slow enough rate so the wave shape of the lowest frequencies recorded will not be changed to a very great extent. As a result, a definite time interval is required for the amplifier gain to be reduced after the first high amplitude signals. Thus, this system permits weak initial signals to appear at a useable amplitude, which is not true of the expander method, but it cannot reduce the gain rapidly enough for proper recording of early reflections following the first high amplitude signals.

It is an object of this invention to provide an automatic volume control system which provides the advantages of both previous types of systems without their disadvantages.

It is a further object of the invention to provide a combination of long and short time constant systems which are controlled by biased electron tubes with the result that the time constants of the filter units following the triodes are changed as the automatic volume control system is operated.

It is another object to provide a system for controlling the gain of the amplifier tubes by applying control voltages to the suppressor grids and to utilize a filter circuit connected to the suppressor grid so as to improve operation of the amplifier circuits.

It is another object of the invention to provide an amplifier which is prevented from operating during the period prior to firing of the shot.

It is a still further object to provide such an amplifier which is easy to construct, utilizes standard circuit components, and is economical to build and manufacture.

Various other objects, advantages and features of the invention will become apparent from the following detailed description taken in conjunction with the accompanying drawings, in which:

Figure 1 is a block diagram showing the automatic volume control system of this invention; and Figure 2 is a schematic circuit diagram illustrating the operation of this invention.

Referring now to the drawings in detail, and particularly to Figure 1, the seismic system includes an amplifier 10 which may have one or more stages, the output of which is fed through a filter 11 to a power amplifier 12, which, in turn, feeds a suitable recording device, not shown. In this manner, the seismic signals are increased in amplitude to such an extent as to readily operate a recording device, while the filter removes certain undesirable components from the input voltages. A portion of the output of power amplifier 12 is fed to a short time constant automatic volume control circuit 13 and to a long time constant automatic volume control circuit 14. The automatic volume control circuith 13 and 14 operate in conjunction with filter 15 to regulate the gain of amplifier 10 so as to insure that the power amplifier output voltage maintains a sufficiently constant amplitude as to be properly recorded.

The long time constant circuit gradually increases the gain of the amplifier during the recording period to compensate for the relatively gradual decrease in signal intensity resulting from the progressive decrease in amplitude of the seismic waves, as the recording period progresses. The short time constant circuit operates very quickly when there is an increase in amplitude of the signal above a predetermined level, as at the very beginning of the recording period. Since the short time constant functions only in response to signals of high enough amplitude as to drive the recorder trace off the chart, it does not interfere with operation of the circuit after the initial high amplitude wave and, hence, has no tendency to distort the wave form of the latter part of the recording.

Referring now to Figure 2, the novel automatic volume control circuits are operatively connected to pentodes 20 and 21 which are, respectively, the first and second stage amplifier tubes of the unit 10, Figure 1. These tubes are connected in a conventional amplifier circuit which will be described in detail hereinafter, and the output of tube 21 is fed through the filter 11 and, thence, to the power amplifier 12 which includes a pentode 22, Figure 2, as its output tube. The output circuit of pentode 22 includes a coupling condenser 23 for connecting the anode to a primary winding of an output transformer 24, and the secondary winding of this transformer is coupled to the input circuit of a suitable recorder, not shown, which produces traces on a recording medium representative of the amplitude of the amplified seismic signals passing from the output circuit of power amplifier 12. An operating potential is supplied to the anode of tube 22 from a positive terminal 25 of a suitable power source, this terminal being connected through series resistors 26, 27 to the anode, and a grounded filter condenser 28 is connected to the junction between the resistors 26 and 27.

In accordance with the invention, a portion of the output of power amplifier 22 is fed through a lead 30 and coupling condensers 31, 32 to the respective control grids of tubes 33 and 34. In the example shown, the control tubes are triodes and, accordingly, each of them has an anode, a cathode, and a control grid. It will be apparent that tubes with more electrodes, such as tetrodes, or pentodes, may be substituted for the triodes without departing from the spirit and scope of the invention.

The tube 33 is biased substantially to cut off and the tube 34 is biased several volts beyond cut off so that tube 33 becomes conductive when a relatively weak signal passes through power amplifier 12 while tube 34 does not become conductive unless a signal of relatively high amplitude is passed through the power amplifier 12. To this end, a bias network is provided for the tubes 33 and 34, this network including a lead 35 interconnecting the cathodes of the tubes, and a unit including a potentiometer 36, a resistor 37, and a potentiometer 38, all connected in series. A bias battery 39 has its positive terminal connected to lead 35 and its negative terminal connected to the junction between resistor 37 and potentiometer 38 while a battery 40 has its negative terminal connected to lead 35 and its positive terminal grounded at 41. A grid resistor 42 is connected between the control grid of triode 33 and the arm of potentiometer 36 while a grid resistor 43 is connected between the control grid of triode 34 and the arm of potentiometer 38. It will be apparent that the bias may be adjusted in the manner stated by varying the setting of potentiometers 36 and 38 in such fashion that tube 33 is biased to cut off and tube 34 is biased a few volts beyond cut off. The bias voltage may be tested at terminals 44.

The anode of tube 33 is connected through a resistor 45 and a lead 46 to the suppressor grid of tube 21 and condenser 47 is connected between the anode of tube 33 and ground. The anode of tube 34 is connected directly through lead 46 to the suppressor grid of tube 21, and lead 46 is also connected to grounded condenser 48 and a grounded resistor 49. The voltage drop across resistor 49 may be tested at terminals 50. The suppressor grids of tubes 20 and 21 are interconnected by a resistor 51 and a grounded condenser 52 is connected to the suppressor grid of tube 20.

It will be apparent that condenser 48 and resistor 49 constitute a filter which operates upon the output voltage produced by tube 34. Preferably, condenser 48 has a capacitance of about 2 microfarads, and resistor 49 has a value of 200,000 ohms.

Similarly, the condenser 47 and the resistor 45, in conjunction with the parts already mentioned, constitute a second filter responsive to the output of tube 33. Condenser 47 preferably has a capacitance of one microfarad, and resistor 45 has a value of 50,000 ohms. The time taken to charge filter 48, 49 is determined by the internal resistance of tube 34 and the capacitance of condenser 48. Due to the circuit constants previously given, this filter is described as having a relatively short time constant and control voltages passed by tube 34 act upon the automatic volume control circuit in a relatively brief interval of time. However, signals from tube 33 require a substantially longer time to affect the automatic volume control circuit, as signals from this tube must pass through resistor 45 and charge condenser 48 in addition to charging condenser 47 before they affect the automatic volume control circuit. Accordingly, the filter defined by tube 33 and parts 45, 47, 48 and 49 constitutes a filter of relatively long time constant and signals passing through this path require a relatively long time interval before they affect the automatic volume control circuit.

The filter formed by resistance 51, which preferably has a value of 1.3 megohms, and condenser 52, which preferably has a capacitance of .1 microfarad, has been found to provide improved operation of the circuit through control of the interrelation between the bias potentials supplied to the suppressor grids of tubes 20 and 21.

In accordance with the invention, I also provide a bias battery 55, the negative terminal of which is connected through normally closed contacts 56 of a relay 57 and a resistor 58 to lead 46 and the suppressor grids of tubes 20 and 21. The winding of relay 57 is connected in the anode circuit of a gas filled triode 60, the anode being connected through the relay winding to a positive power supply terminal 61, and the cathode being grounded at 62. The control grid of triode 60 is connected through the secondary winding of a transformer 63 to the negative terminal of a bias battery 64, the positive terminal of which is grounded at 62. The primary winding of transformer 63 is adapted for connection to a time break circuit of the type shown in the copending application of de Boisblanc and Bondurant, Serial No. 628,310, now U. S. Patent 2,470,846, entitled "Seismograph Blaster Time Breaker Circuit." The operation of this circuit is such as to impress a voltage pulse upon transformer 63 at the exact instant when a blasting charge is detonated to produce seismic waves. This voltage pulse is thereupon effective to fire tube 60 and open contacts 56, thereby removing bias battery 55 from the circuit. The plate circuit of the triode 60 is interrupted when the main power supply is turned off after the recording period to restore tube 60 to non-conductive condition.

The operation of the novel automatic volume control system will now be apparent to those skilled in the art. Before the charge is detonated, the contacts of relay 57 are closed and bias battery 55 impresses a potential upon the suppressor grids of tubes 20 and 21 which is sufficiently negative as to prevent amplification of noise signals by these tubes. Although it is preferred that this potential be applied to the suppressor grids, it is to be understood that the bias may be applied to other electrodes, such as the control grid, if desired.

When the charge is detonated, a pulse is applied to transformer 63 with the result that gas tube 60 becomes conductive and relay 57 is energized, thereby opening contacts 56 and removing the bias from the control electrodes of tubes 20 and 21. When gas tube 60 is fired in this manner, it remains conductive until the end of the recording period, that is, until interruption of the main power supply circuit by which a positive operating potential is applied to the anode of tube 60.

After removal of the bias, the seismic signals picked up by the seismometer are amplified by tubes 20, 21 and their associated circuits, the amplifier voltages passing successively through filter 11, Figure 1, tube 22 of power amplifier 12, the output transformer 24 to the recorder equipment. The signals which are amplified in this manner consist of initial first breaks, or signals of very low amplitude. The signal amplitude then may build up to 10,000 or more times its original value, after which it decreases gradually until the end of the recording period. When the initial weak signals are received, no bias is applied to the tubes 20 and 21 and the automatic volume control circuits are inoperative. This results from the fact that tube 33 is biased near cut off while tube 23 is biased a few volts beyond cut off so that no automatic volume control voltage is passed by these tubes. When signals of very high amplitude are picked up shortly after the beginning of the recording period, tubes 33 and 34 both become conductive, assuming, as is normally the case, that these initial high amplitude signals are of sufficient strength as to overcome the bias on both tubes 33 and 34. Due to the long time constant of the filter associated with tube 33, the control voltage produced by this tube is not sufficient to bias tubes 20 and 21 to suppress the signals to the desired extent. However, a very prompt and efficient corrective action is applied by the voltage developed through tube 34 which feeds short time constant filter 48 and 49, this sudden increase in bias voltage quickly biasing the tubes 20 and 21 to reduce the gain to such an extent as to provide the desired useable output from power amplifier 22.

After the initial signal of high amplitude is recorded, the voltages subsequently impressed upon tubes 33 and 34 are not of sufficient magnitude as to overcome the bias on tube 34. Accordingly, this tube becomes inoperative during the remainder of the recording period and the gain level of the amplifier is thereafter controlled entirely by the tube 33. As the signal amplitude decreases during the recording period, the bias voltage produced by tube 33 likewise decreases thereby progressively increasing the gain of amplifier tubes 20 and 21 to maintain a substantially constant amplitude during the remainder of the recording period. Due to the relatively long time constant of the filter associated with tube 33, the shape or wave form of the seismic signals is not appreciably altered during the recording period so that the recorder trace accurately follows the shape of the incoming seismic signals.

It will be apparent that my improved system reduces the sensitivity of the amplifier before firing of the seismic charge, thereby preventing the galvanometer from recording noise on the trace. Thereafter, the two volume control circuits cooperate to provide a useable and substantially constant amplitude signal at the recorder despite large variations in amplitude of the incoming seismic signals. Distortion is effectively prevented by use of the long time constant circuit during the period when the reflected waves are being received whereas the short time constant circuit effectively prevents strong signals from producing too high an amplitude on the recorder trace. The filter 51, 52 correlates the control action of tubes 20 and 21 and thereby provides a further improvement in operation of the system.

Figure 2 also shows the detailed circuits of the amplifier 10, filter 11, and power amplifier 12 of Figure 1. These circuits include a transformer 65, the primary winding of which is connected to input terminals 66 and 67, and the secondary winding of which is connected to ground wire 68 and to the control grid of pentode 20. The secondary winding is shunted by a condenser 69 and a plurality of series connected resistances 70, these resistances being connected in circuit with a switch 71 so as to vary the amplitude of the signals fed to the amplifier. When the signal to noise ratio becomes too low, switch 71 is actuated to reduce the amplifier gain with the result that strength of the seismic signals must be increased by increasing the size of the explosive charge to maintain a satisfactory signal to noise ratio.

Except for the connection of its suppressor grid to the described automatic volume control circuit, each pentode 20 and 21 is connected in a conventional amplifier circuit. To this end, the cathode of tube 20 is connected to ground through a bias resistor 72 which is shunted by a filter condenser 73. The screen grid of tube 20 is connected to a positive power supply terminal 74 by a voltage dropping resistor 73 and to ground by a filter condenser 75. The anode of tube 20 is connected to the control grid of tube 21 by a coupling condenser 76 and to a positive power supply terminal 77 by voltage dropping resistors 78. A grid resistor 79 is connected between the control grid of pentode 21 and ground while the cathode of this tube is connected to ground through a bias resistor 80 which is shunted by a filter condenser 81. The anode of tube 21 is connected through a voltage dropping resistor 82 to the junction between resistors 78, this junction being grounded by a by-pass condenser 83, and through a coupling condenser 84 to the filter 11. The circuit thus far described functions to amplify the seismic signals fed to input terminals 66 and 67, the amplifier gain being controlled by the automatic volume control circuit in the manner previously described in detail herein.

The filter 11 consists of a high pass section 85 and a low pass section 86. High pass section 85 includes a set of condensers 87, a set of condensers 88, a switch 89, and a dual inductance, the sections 90 and 91 of which are wound upon a common magnetic core. The switch 89 selectively connects one of the condensers 87 in series with inductance section 91 and one of the condensers 88 or, alternatively, switch 89 may merely connect the inductance sections 90 and 91 in the circuit. In any case, inductance section 90 is connected between one terminal of inductance section 91 and ground. It will be apparent that the pass band characteristics of the filter may be adjusted at will by the switch 89 to alter the cut-off frequency of the filter. The two section inductance 90, 91 provides excellent cut-off characteristics for the filter and greatly improves its efficiency, as compared with high pass filters previously utilized. The output of high pass filter 85 appears at a terminal 93 which is connected to ground through a resistance 94 and to low pass filter section 86 through a coupling resistance 95.

The low pass filter 86 includes two series 96 and 97 of condensers which are connected, respectively, to multi-position switches 98 and 99, the arms of these switches being connected, in turn, to opposite terminals of an inductance 100. Accordingly, the low pass filter section includes series inductance 100, each terminal of which is connected to ground through one of the condensers 96 or 97. It will be apparent that the cut-off frequency of this filter may be altered by suitable adjustment of the switches 98 and 99 to change the cut-off frequency of the filter.

The output of low pass filter 86 is connected by a lead 101 to the control grid of pentode 22, and lead 101 is also connected to ground through a grid resistor 102. The cathode of pentode 22 is connected to ground through a bias resistor 103 which is shunted by a by-pass condenser 104. The suppressor grid of tube 22 is connected directly to its cathode, and the screen grid of tube 22 is connected through a voltage dropping resistor 105 to positive power supply terminal 25 and through a filter condenser 106 to ground. The output circuit of pentode 22 has already been described in connection with the automatic volume control circuit.

It will be apparent that the amplifier 10, and filter 11 function to amplify the seismic signals fed to the input terminals 66 and 67, the amplifier gain being regulated jointly by switch 71 and the automatic volume control circuits. In addition, the filter 11 limits the output signals to frequencies within a predetermined range, signals of higher than a predetermined frequency being eliminated by filter sections 86 and signals of lower than a predetermined frequency being eliminated by filter section 85. The novel circuit of filter section 85 permits a very sharp cut-off to be obtained as compared with high pass filters heretofore utilized.

While the invention has been described in connection with a present, preferred embodiment thereof, it is to be understood that this description is illustrative only and is not intended to limit the invention, the scope of which is defined by the appended claims.

Having described my invention, I claim:

1. An automatic volume control unit comprising, in combination, an amplifier tube having a control electrode for regulating its gain, a power amplifier stage fed by said amplifier tube, a pair of control tubes each having an anode, a cathode, and a control grid, means for supplying operating and bias potentials to said control tubes so that one tube is biased substantially to cut off and the other tube is biased beyond cut off, means for feeding a portion of the power amplifier output to the control grid of each control tube, a filter having a relatively long time constant fed by said one control tube, a filter having a relatively short time constant fed by said other control tube, and means for feeding back the output of both filters to said control electrode.

2. An automatic volume control unit comprising, in combination, a two stage amplifier, each stage including an amplifier tube having a control electrode for regulating its gain, a power amplifier stage fed by the second amplifier tube, a pair of control tubes each having an anode, a cathode, and a control grid, means for supplying operating and bias potentials to said control tubes so that one tube is biased substantially to cut off and the other tube is biased beyond cut off, means for feeding a portion of the power amplifier output to the control grid of each control tube, filter means connecting the anodes of both control tubes with the control electrode of the second amplifier tube, said filter means having a relatively long time constant with respect to signals fed from the anode of said one control tube to said last-mentioned control electrode, and said filter means having a relatively short time constant with respect to signals fed from the anode of said other control tube to said last-mentioned control electrode, and a filter interconnecting said control electrodes, said last mentioned filter including a resistance connected between the two control electrodes, and a condenser connected between the control electrode of the first amplifier tube and ground.

3. An automatic volume control unit comprising, in combination, a two stage amplifier unit, each stage including an amplifier tube having a control electrode for regulating its gain, a power amplifier fed by the last stage of said amplifier, a pair of control tubes each having an anode, a cathode, and a control grid, means for supplying operating and bias potentials to said control tubes so that one control tube is biased substantially to cut off and the other tube is biased beyond cut off, means for feeding a portion of the power amplifier output to the control grid of each control tube, a filter having a relatively long time constant including a resistor and a condenser each having one terminal connected to the anode of said one control tube, the other terminal of the condenser being grounded and the other terminal of the resistor being connected to the control electrode of the second amplifier stage, a filter having a relatively short time constant including a condenser connected between the anode of said other control tube and ground and a resistance shunting said condenser, a lead connecting the anode of said other control tube to the control electrode of the second amplifier stage, and a filter interconnecting said control electrodes, said filter including a resistance connected between said control electrodes and a condenser having one terminal grounded and having its other terminal connected to the control electrode of the first amplifier tube.

4. An automatic volume control unit comprising, in combination, a two stage amplifier unit, each stage including an amplifier tube having a control electrode for regulating its gain, a power amplifier fed by the last stage of said amplifier, a pair of control tubes each having an anode, a cathode, and a control grid, means for supplying operating and bias potentials to said control tubes so that one tube is biased substantially to cut off and the other tube is biased beyond cut off, means for feeding a portion of the power amplifier output to the control grid of each control tube, a filter having a relatively long time constant including a resistor and a condenser each having one terminal connected to the anode of said one control tube, the other terminal of the condenser being grounded and the other terminal of the resistor being connected to the control electrode of the second amplifier stage, a filter having a relatively short time constant including a condenser connected between the anode of said other control tube and ground, and a resistance shunting said condenser, a lead connecting the anode of said other control tube to the control electrode of the second amplifier stage, and a filter interconnecting said control electrodes, said filter including a resistance connected between said control electrodes and a condenser having one terminal grounded and having its other terminal connected to the control electrode of the first amplifier tube, a battery for impressing a cut off bias on both of said control electrodes, a relay having normally closed contacts in circuit with said battery and said electrodes, a gas filled triode having the winding of said relay connected in its anode circuit, means for applying operating potentials to the electrodes of said gas filled triode so that it is normally biased beyond cut off, means for overcoming said bias on firing of a seismic charge to cause said gas filled triode to become conductive, thereby to actuate said relay and remove the cut off bias from said control electrodes.

5. An automatic volume control unit comprising, in combination, an amplifier stage including a tube having a suppressor grid, the gain of said amplifier being adjustable by control of the suppressor grid voltage, a power amplifier stage fed by said amplifier tube, a pair of control tubes each having an anode, a cathode, and a control grid, means for supplying operating and bias potentials to said control tubes so that one tube is biased substantially to cut off and the other tube is biased beyond cut off, means for feeding a portion of the amplifier signal to the control grid of each control tube, filter means connecting the anodes of both control tubes with said suppressor grid, said filter means having a relatively long time constant with respect to signals fed from the anode of said one control tube to said last-mentioned control electrode, and said filter means having a relatively short time constant with respect to signals fed from the anode of said other control tube to said last-mentioned control electrode.

6. An automatic volume control unit comprising, in combination, a two stage amplifier unit, each stage including an amplifier tube having a suppressor grid, the gain of each stage being adjustable by varying the voltage applied to said suppressor grid, a power amplifier fed by the last stage of said amplifier, a pair of control tubes each having an anode, a cathode, and a control grid, means for supplying operating and bias potentials to said control tubes so that one tube is biased substantially to cut off and the other tube is biased beyond cut off, means for feeding a portion of the power amplifier output to the control grid of each control tube, a filter having a relatively long time constant including a resistor and a condenser each having one terminal connected to the anode of said one control tube, the other terminal of the condenser being grounded and the other terminal of the resistor being connected to the suppressor grid of the second amplifier stage, a filter having a relatively short time constant including a condenser connected between the anode of said other control tube and ground, and a resistance shunting said condenser, a lead connecting the anode of said other control tube to the suppressor grid of the second amplifier stage, and a filter interconnecting said suppressor grids, said filter including a resistance connected between said suppressor grids and a condenser having one terminal grounded and having its other terminal connected to the suppressor grid of the first amplifier tube.

7. An automatic volume control unit for a seismic amplifier system comprising, in combination, a two stage amplifier unit, each stage including an amplifier tube having a suppressor grid, the gain of the amplifier being adjustable by varying the voltage applied to the suppressor grid, a power amplifier fed by said two stage amplifier, a battery for impressing a cut off bias on both suppressor grids, a relay having normally closed contacts in circuit with said battery and said suppressor grids, a gas filled triode having the winding of said relay connected in its anode circuit, means for applying operating potential to the electrodes of said triode so that it is normally biased beyond cut off, means for overcoming said bias on firing of a seismic charge to cause said triode to become conductive, thereby to actuate said relay and remove the cut off bias from said suppressor grids, and an automatic volume control system for controlling the potential of said suppressor grids after the relay is actuated, a pair of control tubes each having an anode, a cathode, and a control grid, means for applying operating and bias potentials to said control tubes so that one tube is biased substantially to cut off and the other tube is biased beyond cut off, means for feeding a portion of the power amplifier output to the control grid of each control tube, a filter having a relatively long time constant fed by said one control tube, a filter having a relatively short time constant fed by said other control tube, means for feeding back the output of both filters to the suppressor grid of the second amplifier tube, and a filter interconnecting the suppressor grids of said amplifier tubes, said last-mentioned filter including a resistance interconnecting said suppressor grids, and a condenser having one terminal grounded and having its other terminal connected to the suppressor grid of the first amplifier stage.

8. An automatic volume control unit comprising, in combination, an amplifier tube having a control electrode for regulating its gain, a filter fed by said amplifier tube for rejecting signals of higher than a first predetermined frequency, and for rejecting signals of lower than a second predetermined frequency, a power amplifier stage fed by said filter, a pair of triodes each having an anode, a cathode, and a control grid, means for supplying operating and bias potentials to said triodes so that one triode is biased substantially to cut off and the other triode is biased beyond cut off, means for feeding a portion of the power amplifier output to the control grid of each triode, means for filtering the output of both of said triodes and feeding the filtered output back to said control electrode.

9. A high pass filter comprising, in combination, a set of input terminals, a set of output terminals, a circuit interconnecting one input terminal and one output terminal, said circuit including a first condenser, an inductance and a second condenser, all connected in series, a second inductance having one terminal thereof connected to said first inductance, and means interconnecting the other input terminal, the other output terminal, and the other terminal of said second inductance, said inductances having a common magnetic core.

10. A high pass filter comprising, in combination, a pair of input terminals, a pair of output terminals, a circuit connecting one input terminal to one output terminal, said circuit including a set of condensers, a first inductance, a switch for selectively connecting one terminal of said first inductance in series with one of said set of condensers and said one input terminal, a second set of condensers, a switch for selectively connecting the other terminal of said first inductance in series with one of said second set of condensers and said one output terminal, a second inductance having one terminal thereof connected to said first inductance, said inductances having a common magnetic core, and means interconnecting said other terminal of the second inductance, the other input terminal, and the other output terminal.

11. An automatic volume control unit comprising, in combination, an amplifier tube having a control electrode for regulating its gain, a filter fed by said amplifier tube for rejecting signals of higher than a first predetermined frequency, and for rejecting signals of lower than a second predetermined frequency, said filter including a high pass section consisting of a first condenser, an inductance, and a second condenser, all connected in series, and a second inductance connected between one terminal of said first inductance and ground, said inductances having a common magnetic core, a power amplifier stage fed by said filter, a pair of triodes each having an anode, a cathode, and a control grid, means for supplying operating and bias potentials to said triodes so that one triode is biased substantially to cut off and the other triode is biased beyond cut off, means for feeding a portion of the power amplifier output to the control grid of each triode, means for filtering the output of both of said triodes and feeding the filtered output back to said control electrode.

12. An automatic volume control unit comprising, in combination, an amplifier tube having a control electrode for regulating its gain, a filter fed by said amplifier tube for rejecting signals of higher than a first predetermined frequency, and for rejecting signals of lower than a second predetermined frequency, said filter including a high pass section including two sets of condensers, and a dual inductance, means for selectively connecting one condenser of each set in series with one section of said inductance, and means for grounding the other section of said inductance, a power amplifier stage fed by said filter, a pair of triodes each having an anode, a cathode, and a control grid, means for supplying operating and bias potentials to said triodes so that one triode is biased substantially to cut off and the other triode is biased beyond cut off, means for feeding a portion of the power amplifier output to the control grid of each triode, means for filtering the output of both of said triodes and feeding the filtered output back to said control electrode.

13. An automatic volume control unit comprising an amplifier including a tube having a control electrode for regulating its gain, a pair of control tubes each having at least an anode, a cathode, and a control grid, means for supplying operating potentials and adjustable bias potentials to said control tubes, means for feeding a signal from said amplifier to the control grid of each control tube, filter means connecting the anodes of both control tubes with said control electrode, said filter means having a relatively long time constant with respect to signals fed from the anode of said one control tube to said last-mentioned control electrode, and said filter means having a relatively short time constant with respect to signals fed from the anode of said other control tube to said last-mentioned control electrode.

14. An automatic volume control unit comprising, in combination, an amplifier having a plurality of stages, each of two of said stages including an amplifier tube having a control electrode for regulating its gain, a pair of control tubes each having at least an anode, a cathode, and a control grid, means for supplying operating potentials and adjustable bias potentials to said control tubes, means for feeding a signal from said amplifier to the control grid of each tube, filter means connecting the anodes of both control tubes with the control electrode of one of said amplifier tubes, said filter means having a relatively long time constant with respect to signals fed from the anode of said one control tube to said last-mentioned control electrode, and said filter means having a relatively short time constant with respect to signals fed from the anode of said other control tube to said last-mentioned control electrode, and a filter interconnecting said control electrodes, said last-mentioned filter including a resistance connected between the two control electrodes, and a condenser connected between the control electrodes of the first amplifier tube and ground.

ORIN C. MONTGOMERY.

References Cited in the file of this patent

UNITED STATES PATENTS

| Number | Name | Date |
| --- | --- | --- |
| 2,052,110 | Pfister | Aug. 25, 1936 |
| 2,164,939 | Pfister | July 4, 1939 |
| 2,301,739 | Minton | Nov. 10, 1942 |
| 2,316,354 | Moritz Jr. | Apr. 13, 1943 |
| 2,352,825 | Fay | July 4, 1944 |
| 2,354,420 | Minton | July 25, 1944 |
| 2,374,204 | Hoover Jr. | Apr. 24, 1945 |
| 2,408,001 | Shimek et al. | Sept. 24, 1946 |
| 2,423,797 | Reber | July 8, 1947 |
| 2,532,263 | Silvey | Nov. 28, 1950 |